J. BOWEN.
FRICTION CLUTCH.
APPLICATION FILED MAR. 15, 1919.

1,309,996.

Patented July 15, 1919.
3 SHEETS—SHEET 2.

Inventor
JAMES BOWEN

By
Harry Smith
Attorney

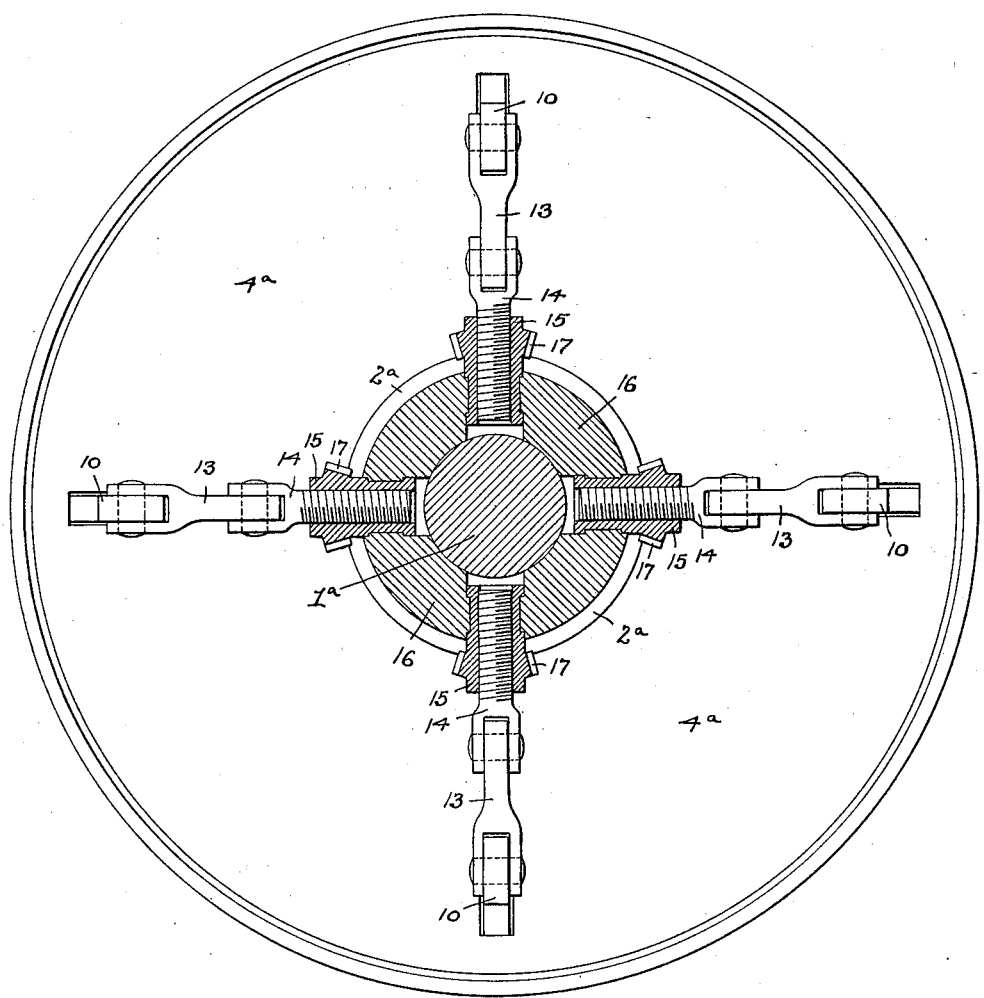

UNITED STATES PATENT OFFICE.

JAMES BOWEN, OF MANHEIM, PENNSYLVANIA, ASSIGNOR TO BOND FOUNDRY & MACHINE COMPANY, OF MANHEIM, PENNSYLVANIA, A CORPORATION OF PENNSYLVANIA.

FRICTION-CLUTCH.

1,309,996.  Specification of Letters Patent.  Patented July 15, 1919.

Application filed March 15, 1919. Serial No. 282,789.

*To all whom it may concern:*

Be it known that I, JAMES BOWEN, a citizen of the United States, residing in Manheim, Lancaster county, Pennsylvania, have invented certain Improvements in Friction-Clutches, of which the following is a specification.

My invention relates to that type of friction clutches in which the clutching members are actuated by a series of levers, the object of my invention being to provide mechanism whereby the action of said levers upon said members may be so regulated that all of said members, both in clutching and releasing, will act simultaneously and with the same effect.

In the accompanying drawings

Fig. 3 is a transverse sectional view on the line 3—3, Fig. 1, and

Figure 1:
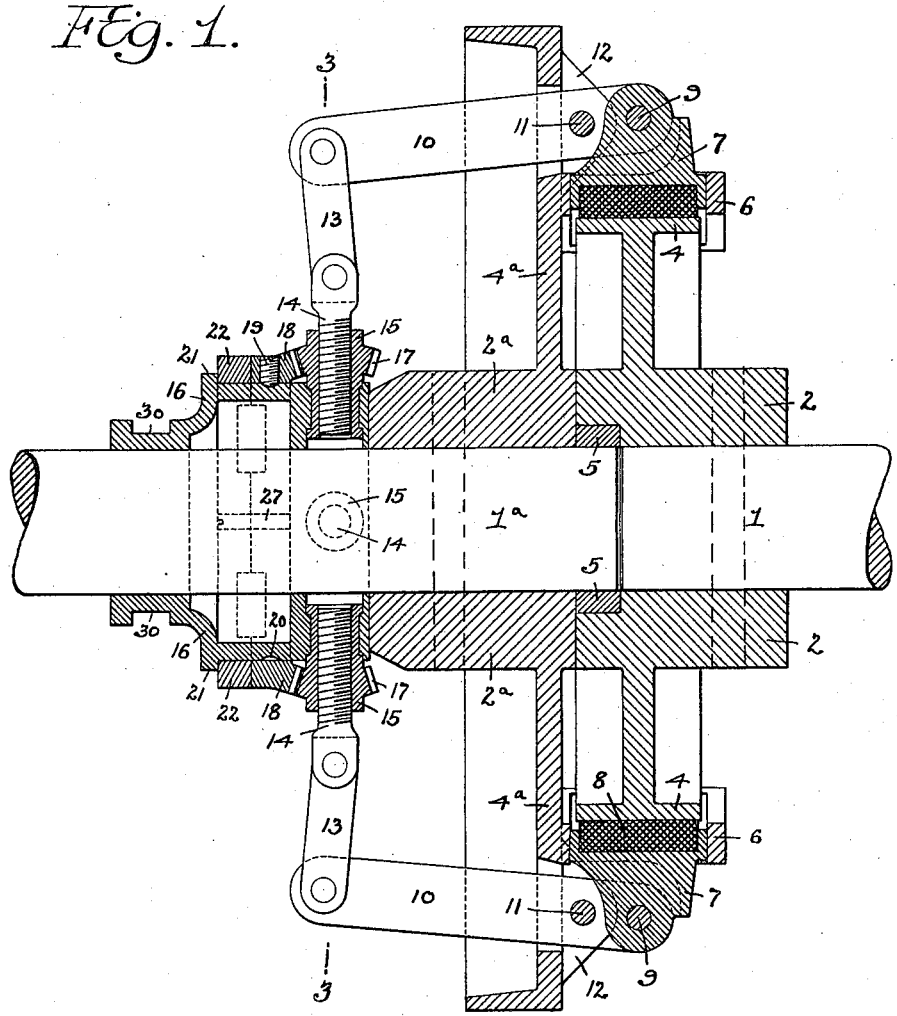
Figure 1 is a longitudinal sectional view of clutching and releasing mechanism, for shafts, constructed in accordance with my invention.

In the drawing, I have illustrated my invention as applied to a clutching device of that type in which the clutching members engage the periphery of a drum or pulley, 1 representing the end portion of the driving shaft and $1^a$ the end portion of an adjoining shaft in line axially therewith and intended to be driven therefrom. Secured to the shaft 1 is the hub 2 of a drum or pulley 4, and secured to the shaft $1^a$ is the hub $2^a$ of the disk $4^a$. A ring 5 is contained within a recess in the hub 2 of the pulley 4, said ring being secured to said hub and serving as a bearing for the end of the shaft $1^a$.

Projecting from the face of the disk $4^a$ are a series of segmental ribs 6 which are slotted for the radial guidance of clutch members 7, the latter being provided with blocks 8 of wood or other fibrous frictional material for contact with the peripheral surface of the drum or pulley 4. Each of the clutch members 7 is hung by means of a pin 9 to the short arm of a lever 10, the latter being pivotally mounted, by means of a fulcrum pin 11, upon ears 12 projecting from the face of the disk $4^a$. The long arm of each lever 10 is connected by a link 13 to the outer end of a screw stem 14 which is engaged by a nut 15 mounted so as to be free to rotate in but radially confined to an opening in a spool 16 which can be moved to and fro longitudinally on the shaft $1^a$.

That portion of each nut 15 which projects beyond the periphery of the spool 16 has formed upon it a toothed bevel wheel 17, which is normally engaged by the teeth of an annular rack 18 rotatably mounted on the spool 16 and normally retained thereon in engaging position with the bevel wheels 17 by engagement of the point of a screw plug 19 in the rack with an annular groove 20 formed in the periphery of the spool 16, as shown in Fig. 1.

Figure 4:
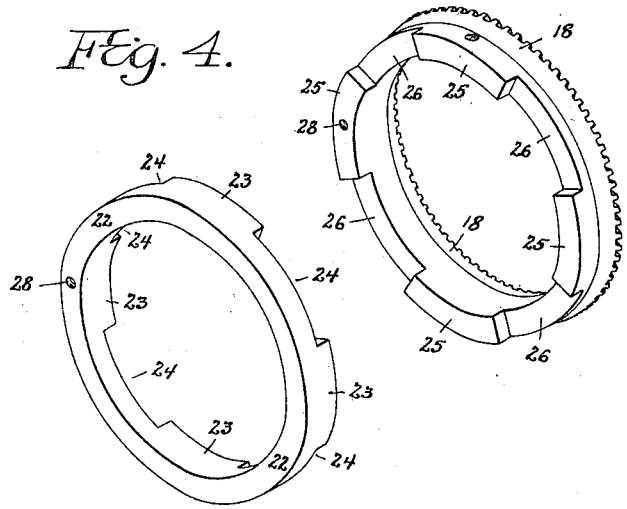
Fig. 4 is a perspective view of certain elements of the adjusting mechanism separated from one another and detached from their carrier.

Associated with the rack 18 and confined between the outer face of said rack and a shoulder 21 on the spool 16 is a ring 22 whose inner face presents a succession of segmental projections 23 and intervening segmental recesses 24, as clearly shown in Fig. 4.

Figure 2:
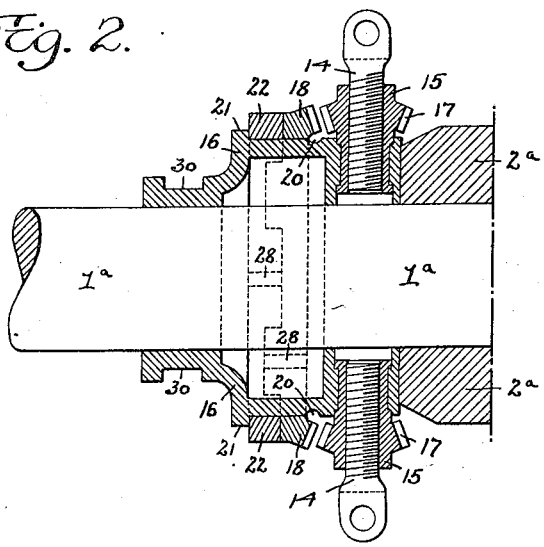
Fig. 2 is a similar view of a portion of the mechanism, showing some of the parts in different positions from those shown in Fig. 1.

The outer face of the annular rack 18 likewise presents a succession of segmental projections 25 and intervening segmental recesses 26, as also shown in Fig. 4, and when the faces of the projections 23 of the ring 22 are in contact with the faces of the projections 25 of the annular rack 18, as shown in Fig. 1, said rack will be held in engagement with the bevel pinions 17 of the nuts 15, but when the ring 22 and rack 18 are so adjusted circumferentially on the spool 16 that the projections 23 of the ring are in line with the recesses 26 of the rack and the projections 25 of the rack are in line with the recesses 24 of the ring, said rack can, on backing off the plug 19, be moved longitudinally on the spool 16 to such an extent as to free its teeth from engagement with the teeth of the bevel pinions 17, as shown in Fig. 2.

Normally, the projections 23 of the ring 22, and the projections 25 of the rack 18 are in contact with one another and the teeth of the rack 18 and pinions 17 engage one another, as shown in Fig. 1, hence rotative movement of the rack on the spool 16 will cause simultaneous operation of all pinions 17 and like simultaneous adjustment of all of the clutching members 7 to the same extent.

Preferably, the ring 22 and rack 18 are normally retained in such circumferential relation to one another by means of a screw pin 27, shown by dotted lines in Fig. 1, said pin being adapted to openings 28 formed in the ring and rack, as shown in Fig. 4, and being withdrawn whenever it is desired to effect circumferential movement of ring or rack in respect to one another.

If it should be necessary at any time to radially adjust one of the clutching members 7 independently of the others, as for instance, in case of greater wear upon one of the blocks 8 than upon the others, the rack 18 is moved longitudinally on the spool and withdrawn from engagement with the pinions 17, as previously described, and the nuts 15 can then be turned independently of one another to effect the desired independent radial adjustment of either of the clutch members 7, the parts being then restored to their normal positions, as shown in Fig. 1, and again retained in such positions by reëngaging the plug 19 with the groove 20 and reinserting the pin 27 in the openings 28.

In order to effect movement of the spool 16 to effect tightening or loosening of the clutch members 7 said spool has the usual grooved collar 30 for engagement with studs on the clutch operating lever.

It will be noted on reference to Fig. 1, that when the parts are in clutching position, the axes of the pins which connect the inner ends of the links 13 to the screw stems 14 are moved to a slight extent inwardly beyond a radial line passing through the axes of the pins whereby the links 13 are connected to the levers 10, thereby locking the spool 16 in position and preventing accidental movement of the same such as would cause release or slackening of the hold of the clutch members upon the drum or pulley 4.

While I have shown my invention as employed in connection with a clutch having four clutching members and operating parts therefor, it will be evident that the number of such clutching members and their respective operating connections may be increased or decreased, as desired, and although I have shown and described my invention as employed in connection with a clutch it is obvious that it is equally applicable for use in connection with a friction brake. When so used the friction blocks 8 and attendant mechanism will either be mounted upon a stationary structure and brake upon a rotating disk or they will be carried by a rotating structure and brake upon a stationary disk. The claims will be read with this use of my invention understood.

I claim:

1. The combination, in a friction clutch of the character specified, of a plurality of radially movable clutch members, levers acting thereon, screw stems connected to said levers, nuts engaging said screw stems, pinions on said nuts, and an annular rack adjustable into or out of engagement with said pinions.

2. The combination, in a friction clutch of the character specified, of a plurality of radially movable clutch members, levers acting thereon, screw stems connected to said levers, nuts engaging said screw stems, pinions on said nuts, a spool in which said nuts are rotatably mounted, and an annular rack mounted on said spool and adjustable thereon so as to be moved into or out of engagement with said pinions.

3. The combination, in a friction clutch of the character specified, of a plurality of radially movable clutch members, levers acting thereon, screw stems, links connecting said screw stems to said levers, nuts engaging said screw stems, pinions on said nuts, a spool in which said nuts are rotatably mounted, and means for moving said spool so as to carry the axes of the connections between the links and the screw stems beyond the axes of the connections between the links and the levers, in order to lock the latter in position.

4. The combination, in a friction clutch of the character specified, of a plurality of radially movable clutch members, levers acting thereon, screw stems connected to said levers, nuts engaging said screw stems, pinions on said nuts, a spool in which said nuts are rotatably mounted, an annular rack adjustable into or out of engagement with said pinions, and a ring for engaging said rack, the adjoining faces of said ring and rack having projections and intervening recesses whereby circumferential movement of either the ring or the rack in respect to the other will move said projections into line with one another or into line with the recesses.

5. The combination, in a friction clutch of the character specified, of a plurality of radially movable clutch members, levers acting thereon, screw stems connected to said levers, nuts engaging said screw stems, pinions on said nuts, a spool in which said nuts are rotatably mounted, an annular rack adjustable into or out of engagement with said pinions, a ring for engaging said rack, the adjoining faces of said ring and rack having projections and intervening recesses whereby circumferential movement of either the ring or the rack in respect to the other will move said projections into line with one another or into line with the recesses, and means for locking together the ring and rack and serving to prevent circumferential movement of one in respect to the other when the projections are in engagement.

6. The combination, in a friction clutch of the character specified, of a plurality of radially movable clutch members, levers acting thereon, screw stems connected to said levers, nuts engaging said screw stems, pinions on said nuts, a spool in which said nuts are rotatably mounted, an annular rack mounted on said spool and adjustable thereon so as to be moved into or out of engagement with said pinions, and a ring on said spool for engaging said rack, the adjoining faces of said ring and rack having projections and intervening recesses whereby circumferential movement of either the ring or the rack in respect to the other will move said projections into line with one another or into line with the recesses, and a plug carried by the rack and engaging an annular groove in the periphery of the spool to retain said rack in longitudinal position on the spool.

In testimony whereof I have signed my name to this specification.

JAMES BOWEN.